No. 729,275. PATENTED MAY 26, 1903.
A. CASTELIN.
MEANS FOR COUPLING AGRICULTURAL MACHINES TO MOTORS.
APPLICATION FILED FEB. 25, 1903.
NO MODEL.

Witnesses:
James L. Norris, Jr.
F. O. Parker

Inventor
André Castelin
By
James L. Norris
Atty.

No. 729,275. Patented May 26, 1903.

UNITED STATES PATENT OFFICE.

ANDRÉ CASTELIN, OF PARIS, FRANCE, ASSIGNOR TO SOCIÉTÉ ANONYME D'ETUDES ET D'EXPLOITATION DES BREVETS A. CASTELIN POUR MACHINES AGRICOLES AUTOMOBILES, OF PARIS, FRANCE.

MEANS FOR COUPLING AGRICULTURAL MACHINES TO MOTORS.

SPECIFICATION forming part of Letters Patent No. 729,275, dated May 26, 1903.

Application filed February 25, 1903. Serial No. 145,033. (No model.)

*To all whom it may concern:*

Be it known that I, ANDRÉ CASTELIN, a citizen of the French Republic, residing at 17 Rue St. Florentin, Paris, France, have invented certain new and useful Improvements in Means for Coupling Agricultural Machines or Apparatus to Motors by which They are Traversed Over the Land, of which the following is a specification.

This invention relates to means whereby agricultural machines or apparatus—such, for example, as those employed in harvesting, mowing, binding, manuring, or sowing—are coupled to a motor (which I will call the "tractor") by which they are traversed over the land, the object of this invention being to provide an improved coupling arrangement.

The arrangement according to this invention consists in the combination of two frames jointed together, one frame being pivoted to the tractor and the other frame being pivoted to the first frame, so that good distribution of the load and perfect adjustment of the height of the machine above the ground can be secured.

In order that this invention may be clearly understood, I shall describe it with reference to the accompanying drawings, of which—

Figure 1:
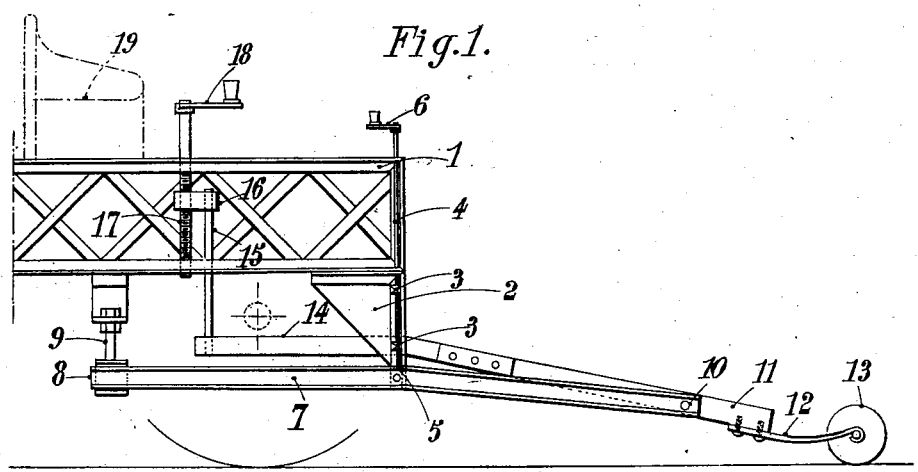
Figure 2:
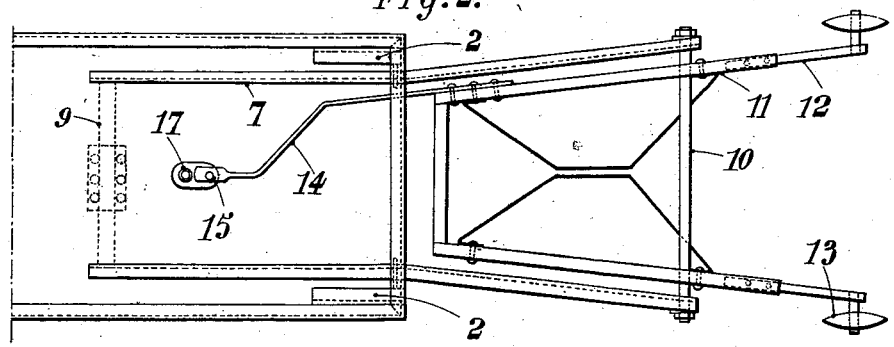

Figure 1 is a lateral view of the improved coupling arrangement. Fig. 2 is the plan.

The frame 1 of the tractor is provided on its fore part with strong brackets 2 2, each of which carries two bearings 3, in which can turn a vertical screw-threaded rod 4, working in a nut 5, connected to the side bars 7 of the movable frame, pivoted to the tractor-frame. The said vertical rods can be rotated by a crank-handle or hand-wheel 6 and the screw-nut, so that the point of attachment of the said movable frame can be adjusted vertically. The side bars 7 of the said movable frame are preferably of channel-irons and extend in one direction below the frame of the tractor to, say, about the center of the tractor, where their ends 8 bear on a strong laminated spring 9, and in the other direction the said side bars extend beyond the tractor and diverge from each other and are connected by a transverse rod 10 or bolt around which can turn the second wooden frame 11, (preferably with side bars diverging like those of the first frame,) supporting the agricultural appliances. The outer ends of this second frame 11 carry laminated springs 12, the forward ends of which carry lenticular or other shaped wheels 13 to bear on the ground. At the other end of the said second frame is secured a lifting-bar 14, carrying a vertical rod 15, provided with a screw-nut 16, in which works a screw-rod 17, provided at its upper end with a crank-handle 18 or hand-wheel within reach from the driver's seat 19. By turning this screw-rod 18 the height of the operating part of the machine above the ground can be adjusted, or the said part can be raised completely away from the ground when required—for example, when traversing harvesters along ordinary roads.

Besides its simplicity the arrangement according to this invention has the advantage of concentrating the whole weight of the machine on the leading wheel, which is generally the driving-wheel, and of thus increasing the adhesion of the tractor on the ground. Moreover, the load being distributed nearly equally on each side of the wheel-axle lifting of the rear of the tractor does not take place.

Having now described my invention and in what manner the same may be performed, I declare that what I claim is—

1. In agricultural machines or apparatus coupled by their back side to a motor or tractor an improved coupling arrangement having a frame 7 jointed to the motor by a screw-nut which can be adjusted vertically and a laminated spring, a wooden frame 11 supporting the agricultural appliances, a transverse rod 10 connected to the frame 7 and on which the frame 11 is pivoted, a lifting-bar 14 secured to the said frame 11, a screw-rod 17 and a crank-handle 18 within reach from the driver's seat for operating the said bar, substantially as described.

2. The combination with a traction device, of a supporting-frame pivotally and adjustably connected therewith, and a frame pivoted to the supporting-frame and adjustably connected with the traction device.

3. The combination with a traction device, of a spring carried thereby, a supporting-frame pivotally and adjustably connected with the traction device and having its inner end adapted to bear against said spring, and a frame pivoted to the supporting-frame and adjustably connected with the traction device.

4. The combination with a traction device, of a spring carried thereby, a supporting-frame pivotally and adjustably connected with said traction device and having its inner end bearing against said spring, a frame pivoted to the supporting-frame and adjustably connected with the traction device, a pair of wheels, and springs for connecting said wheels to the outer end of the frame pivoted to the supporting-frame.

5. The combination with a traction device, of a spring carried thereby, a supporting-frame pivotally connected with the traction device and adapted to have its inner end bearing against said spring, means carried by the traction device and engaging with the supporting-frame for adjusting it, a frame pivoted to the outer end of said supporting-frame, means carried by the traction device and engaging with said last-mentioned frame for adjusting it, a pair of wheels, and springs connected with the wheels and to the frame pivoted upon the supporting-frame, said springs adapted to connect the wheels to the frame pivoted upon the supporting-frame.

In testimony whereof I have hereunto set my hand in presence of two subscribing witnesses.

ANDRÉ CASTELIN.

Witnesses:
PAUL BLUM,
AUGUSTUS E. INGRAM.